US010924583B2

(12) United States Patent
Newton (10) Patent No.: US 10,924,583 B2
(45) Date of Patent: Feb. 16, 2021

(54) OVERLOAD HANDLING IN A CONTENT DELIVERY NETWORK (CDN)

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 120 days.

(21) Appl. No.: 15/360,456

(22) Filed: Nov. 23, 2016

(65) Prior Publication Data

US 2018/0146033 A1     May 24, 2018

(51) Int. Cl.
  *H04L 29/08*     (2006.01)
  *G06F 9/50*      (2006.01)

(52) U.S. Cl.
  CPC ............ *H04L 67/322* (2013.01); *G06F 9/505* (2013.01); *H04L 67/1008* (2013.01)

(58) Field of Classification Search
  CPC ... H04L 67/1031; H04L 67/322; H04L 67/14; H04L 41/0893; H04L 43/16; H04L 43/0888; H04L 67/2828; H04L 67/1008; H04L 65/4084; H04L 65/80; H04L 43/0876; G06F 9/505
  See application file for complete search history.

(56) References Cited

U.S. PATENT DOCUMENTS

| 7,949,779 B2 | 5/2011 | Farber et al. | |
| 8,200,837 B1 * | 6/2012 | Bhatti | H04L 67/02 709/219 |
| 8,832,063 B1 * | 9/2014 | Dean | G06F 16/951 707/707 |
| 2003/0046396 A1 * | 3/2003 | Richter | G06F 9/505 709/226 |
| 2004/0064577 A1 * | 4/2004 | Dahlin | H04L 29/06 709/235 |
| 2005/0120131 A1 * | 6/2005 | Allen | H04L 29/06 709/233 |
| 2006/0015574 A1 * | 1/2006 | Seed | H04L 67/1095 709/219 |

(Continued)

FOREIGN PATENT DOCUMENTS

EP     1049031     11/2000

OTHER PUBLICATIONS

International Search Report dated Mar. 23, 2017, Int'l Appl. No. PCT/US17/012860, Int'l Filing Date Jan. 10, 2017; 3 pgs.

(Continued)

*Primary Examiner* — Kristie D Shingles (57) ABSTRACT

A computer-implemented method, in a content delivery (CD) network, wherein the CD network delivers content on behalf of multiple content providers. At a server in the CD network, wherein the serving is processing multiple requests from a plurality of distinct clients, and based on utilization of at least one capacity of the server, degrading processing of a first at least some of the requests. The server may continue to accept incoming requests while degrading processing of some requests. While processing of any requests is degraded, at least some new incoming requests may also be degraded. Based on the utilization of the at least one capacity of the server, a request may be un-degraded.

17 Claims, 4 Drawing Sheets

(56) References Cited

U.S. PATENT DOCUMENTS

| | | | | |
|---|---|---|---|---|
| 2008/0016214 | A1* | 1/2008 | Galluzzo | H04L 67/322 709/226 |
| 2009/0319681 | A1* | 12/2009 | Freelander | H04L 67/1008 709/233 |
| 2012/0233294 | A1* | 9/2012 | Bhatti | H04L 67/02 709/219 |
| 2012/0321052 | A1* | 12/2012 | Morrill | H04L 67/18 379/32.01 |
| 2014/0372588 | A1* | 12/2014 | Newton | H04L 67/2852 709/223 |
| 2015/0012656 | A1* | 1/2015 | Phillips | H04L 47/26 709/226 |
| 2015/0134612 | A1* | 5/2015 | Silberstein | G06F 16/27 707/634 |

OTHER PUBLICATIONS

Written Opinion of the International Searching Authority dated Mar. 23, 2017, Int'l Appl. No. PCT/US17/012860, Int'l Filing Date Jan. 10, 2017; 7 pgs.

International Preliminary Report on Patentability, dated May 28, 2019, Int'l Appl. No. PCT/US17/012860, Int'l Filing Date Jan. 10, 2017; 9 pgs.

Extended European Search Report, dated Apr. 17, 2020, Application No. 17874200.3, filed Jan. 10, 2017; 10 pgs.

Mundur, Padmavathi et al., "Class-Based Access Control for Distributed Video-on-Demand Systems", *IEEE Transactions on Circuits and Systems for Video Technology* vol. 15, No. 7 Jul. 2005, pp. 844-853.

* cited by examiner

OVERLOAD HANDLING IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

Field of the Invention

This invention relates to content delivery and content delivery networks. More specifically, this invention relates to overload handling in content delivery networks (CDNs).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CD means content delivery;
CDN or CD network means content delivery network;
DNS means domain name system; and
A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
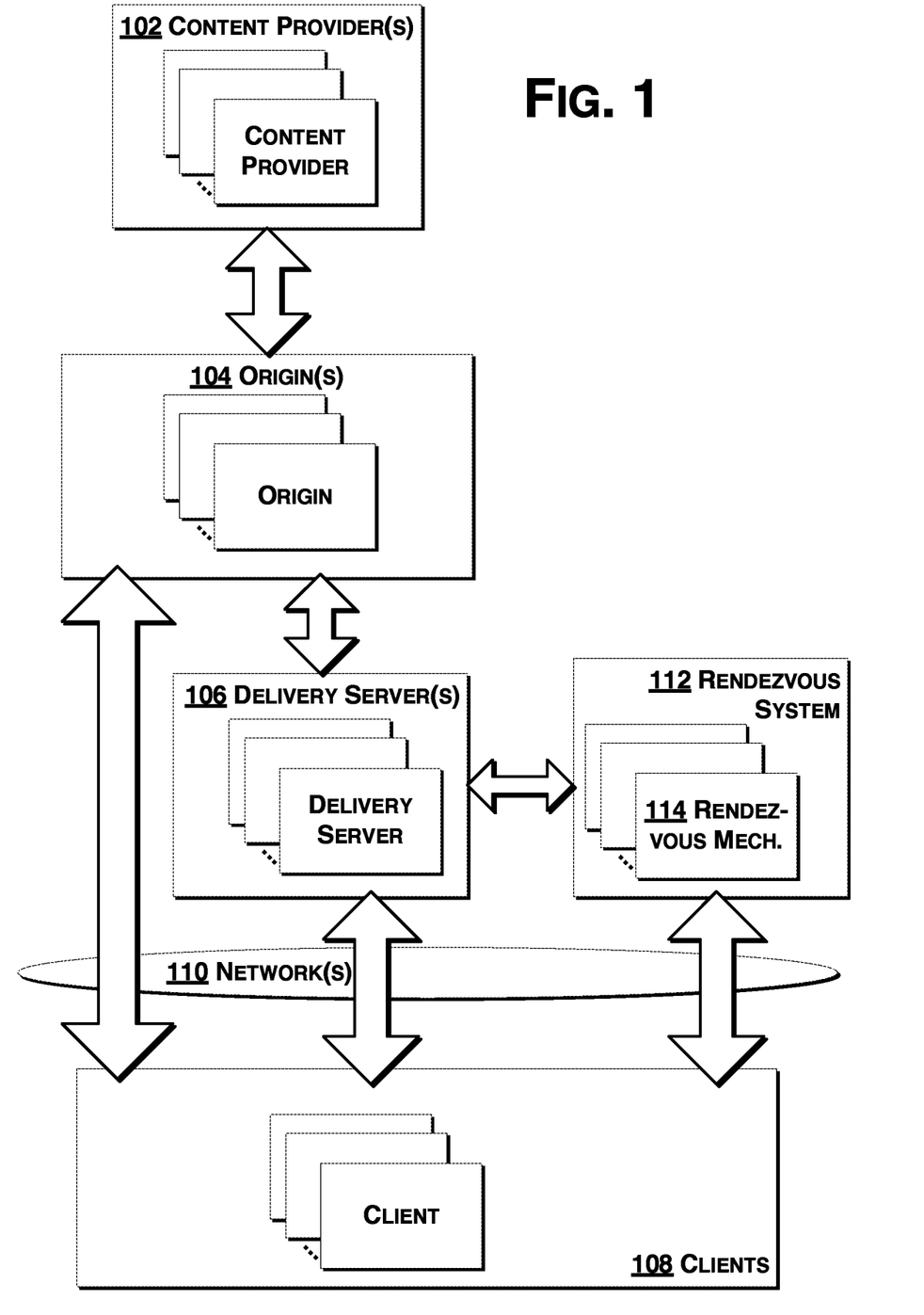
FIG. 1 depicts aspects of an exemplary content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising one or more rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or clusters) to deal with that particular request. The "best" or "optimal" delivery server(s) 106 (or cluster(s)) may be one(s) that is (are) close to the client (by some measure of network cost) and that is (are) not overloaded. Preferably the chosen delivery server(s) 106 (or cluster(s)) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or cluster) need not have the requested content at the time the request is made, even if that chosen delivery server 106 (or cluster) eventually serves the requested content to the requesting client.

Exemplary CDNs are described in U.S. Pat. Nos. 8,060,613 and 8,825,830, the entire contents of both of which are fully incorporated herein by reference in their entirety and for all purposes.

The rendezvous system 112 may be implemented, at least in part, as described in U.S. Pat. No. 7,822,871 titled "Configurable Adaptive Global Traffic Control And Management," filed Sep. 30, 2002, issued Oct. 26, 2010.

Figure 2:
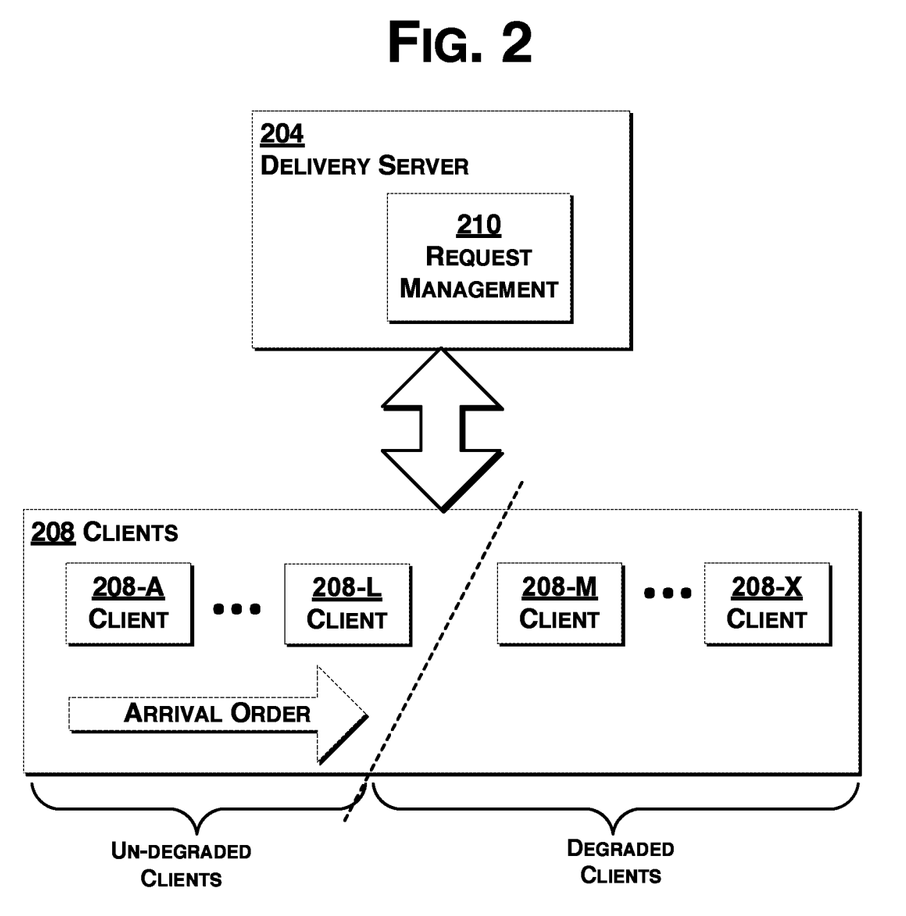
FIG. 2 depicts aspects of a delivery server serving multiple clients according to exemplary embodiments hereof.

In some aspects, a CDN acts as an object delivery system. For example, as shown in FIG. 2, a CDN may provide aspects of a content delivery system to deliver content from a content source 204 to a client 208. The content source 204 may correspond to an arbitrary component of the CDN shown in FIG. 1. For example, the content source 204 may be one or more of: a content provider 102, an origin source 104, a delivery sever 106, etc. Likewise, since (as noted above) components of a CDN (e.g., delivery servers or the like) may use the CDN to deliver content to other CDN components, the client 208 may be or correspond to an arbitrary component of the CDN (e.g., a content provider 102, an origin source 104, a delivery sever 106, or a CDN client 108).

It should be appreciated that the CDN's rendezvous system 112 (in FIG. 1) should not send client requests to overloaded servers, but in some cases (e.g., in the case of flash crowds), the rendezvous system 112 may not have received feedback from the overloaded delivery servers 106 in enough time to affect rendezvous decisions. In these cases the rendezvous system 112 may be sending client requests to overloaded servers (at least until the rendezvous system 112 catches up with feedback from the overloaded servers). Even if the rendezvous system 112 has a current measure of load, there are inherent delays in the rendezvous mechanism 114 used to do the rendezvous (e.g., DNS or the like). For example, DNS TTLs may cause caching by a rendezvous mechanism 114, which may cause rendezvous to overloaded servers. As another example, some client resolvers may not honor DNS TTLs, causing them to re-use IP addresses that now correspond to overloaded servers.

The system described here may be incorporated on some or all of the delivery servers in a CDN and allows the servers and thus the CDN to handle flash crowds. The system allows a delivery server to degrade gracefully.

As shown in FIG. 2, in operation, a particular delivery server 204 (one of the delivery server(s) 106), may be serving multiple clients 208 at the same time. As shown in FIG. 2, the multiple clients 208 are shown in arrival order from left to right, with client 208-A being the oldest and client 208-X being the newest.

During operation, a request management mechanism 210 on the delivery server 204 monitors aspects of its utilization (e.g., its load), and may choose to degrade the performance of some of the clients 208. In a preferred implementation the oldest clients are favored, and one or more of the newest clients are degraded when the delivery server 204 determines that it is, in some way, overloaded. When the delivery server 204 determines that it is no longer overloaded and has sufficient capacity to handle more requests, the server un-degrades at least some of the degraded clients. The degrading of a client may comprise throttling the client down. Note that while a server has degraded some clients, new requests may be accepted, but they may also be degraded.

As shown in the diagram in FIG. 2, when there are some degraded clients, the clients 208 comprise un-degraded clients 208-A to 208-L and degraded clients 208-M to 208-X. As should be appreciated, the diagram in FIG. 2 is given by way of a snapshot example of the system in operation, and, at any one time there may be no degraded clients or only one degraded client. Similarly, at any one time there may be only one un-degraded client. Preferably there is always at least one un-degraded client.

Figure 3:
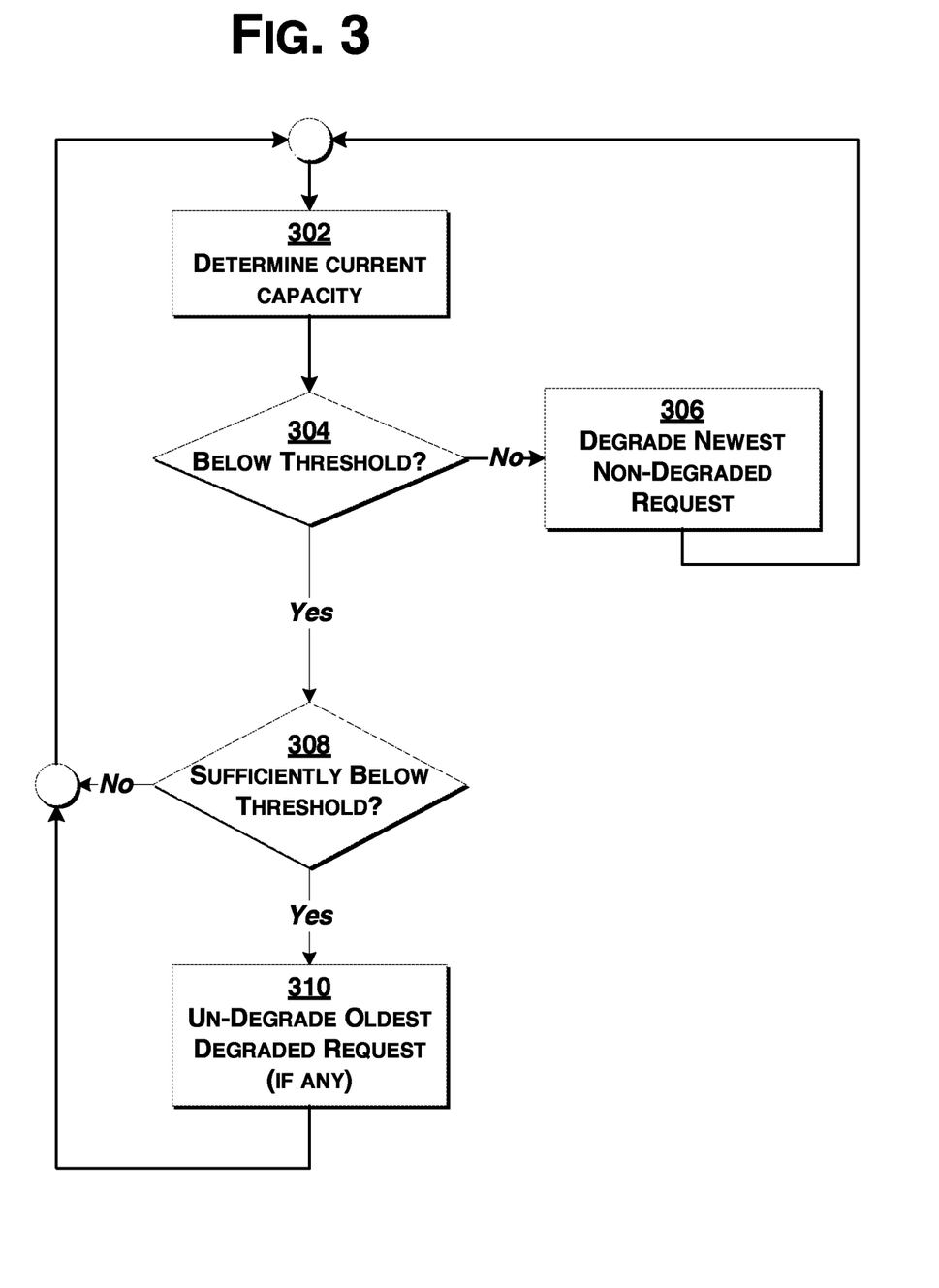
FIG. 3 is a flow chart depicting aspects of operation of the delivery server of FIG. 2, according to exemplary embodiments hereof.

With reference now to the flowchart in FIG. 3, in operation, the request management mechanism 210 (which may be part of the server's request-response processing system) repeatedly performs the following:

Determine (at 302) the current utilization of the server (e.g., its current load). The utilization may be a function of various factors associated with the server, including load, cache size, etc. The server then determines (at 304) if the current utilization is below a certain predetermined or preset threshold. This determination may be made based on a percentage of the utilization, on the server's capacity, or on some other measure. If it is determined (at 304) that the current utilization is not below the certain threshold, then (at 306) the server degrades the newest (most recently arrived) non-degraded client request, after which the server repeats the current utilization determination (at 302). On the other hand, if it is determined (at 304) that the current utilization is at or below the certain threshold, then processing continues to determine if a currently degraded request can be un-degraded.

Accordingly, if it is determined (at 304) that the current utilization is at or below the certain threshold, then the server determines (at 308) if the current utilization is sufficiently below the certain threshold to allow a currently degraded request can be un-degraded.

If it is determined (at 308) that the current utilization is sufficiently below the certain threshold to allow a currently degraded request to be un-degraded, then, if any degraded client requests exist, the oldest degraded client request is un-degraded (at 310), and processing continues (at 302) to again check the server's current utilization. On the other hand, it is determined (at 308) that the current utilization is not sufficiently below the certain threshold to allow a currently degraded request to be un-degraded, then processing continues (at 302) to again check the server's current utilization.

In the determination at 308 the request management mechanism 210 of the server 204 may use a percentage of the threshold used in 304 (e.g., at 90% or 80% or 70%, etc.) or a different predetermined threshold value may be used.

As should be apparent, in operation, the request management mechanism 210 of the server 204 will degrade sufficient non-degraded requests, one by one (at 306), until the current utilization is below the threshold required at 304. The request management mechanism 210 will un-degrade degraded requests, one by one, if any exist, until the utilization is no longer sufficiently below the threshold (at 308). In this manner, degraded client requests may be un-degraded if the delivery server's utilization is sufficient (e.g., because other requests have been completed).

In another embodiment, the management mechanism 210 favors clients based on their time (age) of connection. In this embodiment, a new request from a currently un-degraded client will not automatically be degraded, even if there are currently degraded clients. Additionally, in this embodiment, requests are degraded (at 306) based also on the age of the oldest client requests. For example, if client X has three requests being handled (RX1, RX2, and RX3), and client Y arrived after client X and has three requests being handled (RY1, RY2, and RY3), and the requests are arrived in the order RX1, RY1, RY2, RY3, RX2, RX3, then, in this embodiment, client X will be favored and client Y's requests RY3 and RY2 may be degraded before client X's requests RX2 and RX3. In this embodiment the un-degrading of requests (at 310) will also take into account the age of the oldest client(s), and the oldest clients will be favored.

The server may track the clients based, e.g., on their IP addresses or other unique identifying information in the requests that allows clients to be identified and distinguished.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
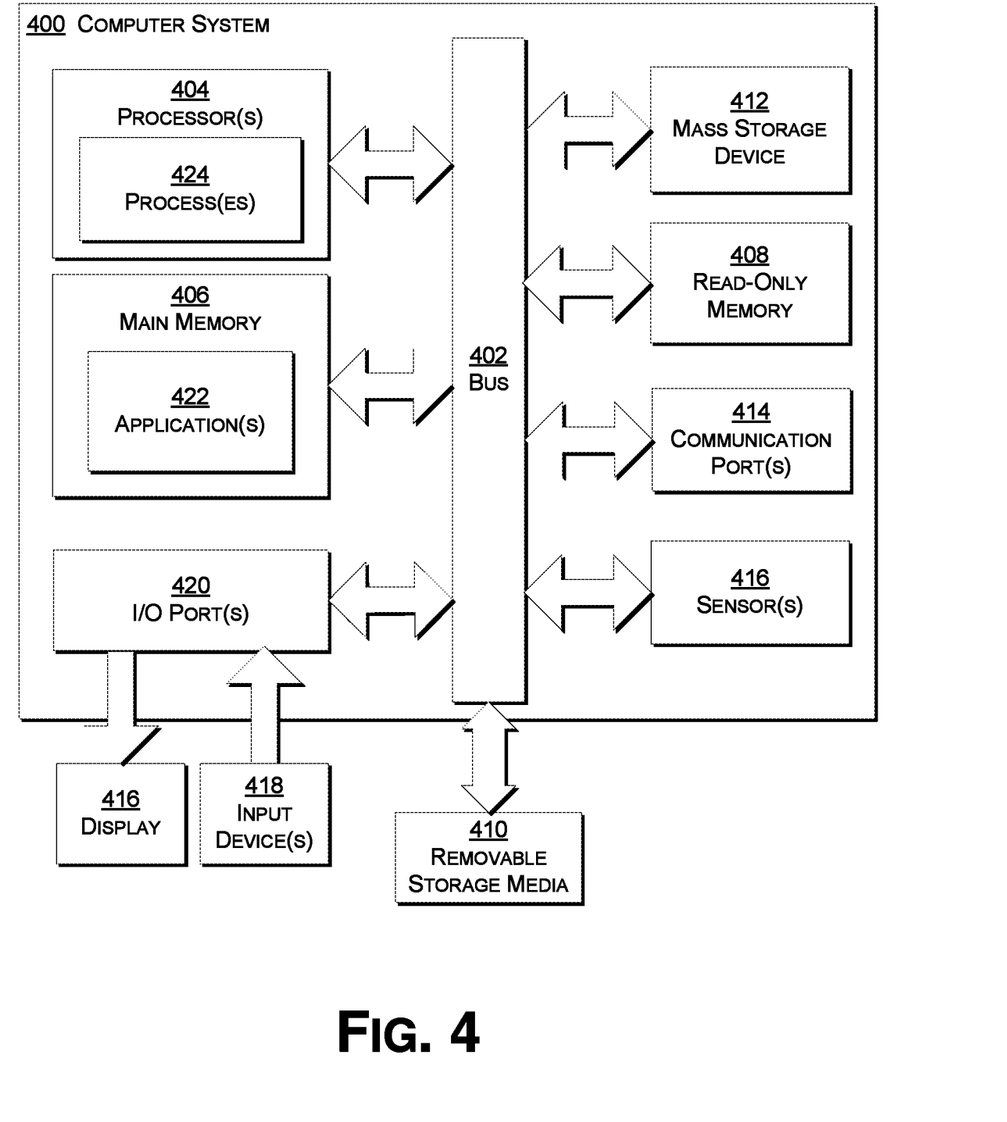
FIG. 4 depicts aspects of computing according to exemplary embodiments hereof.

FIG. 4 is a schematic diagram of a computer system 400 upon which embodiments of the present disclosure may be implemented and carried out.

According to the present example, the computer system 400 includes a bus 402 (i.e., interconnect), one or more processors 404, a main memory 406, read-only memory 408, removable storage media 410, mass storage 412, and one or more communications ports 414. Communication port 414 may be connected to one or more networks by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor (s), AMD® Opteron® or Athlon MP® processor(s), or Motorola® lines of processors, and the like. Communications port(s) 414 can be any of an RS-232 port for use with a modem based dial-up connection, a 10/100 Ethernet port, a Gigabit port using copper or fiber, or a USB port, and the like. Communications port(s) 414 may be chosen depending on a network such as a Local Area Network (LAN), a Wide Area Network (WAN), a CDN, or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory 408 can be any static storage device(s) such as Programmable Read-Only Memory (PROM) chips for storing static information such as instructions for processor 404. Mass storage 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 402 communicatively couples processor(s) 404 with the other memory, storage, and communications blocks. Bus 402 can be a PCI/PCI-X, SCSI, a Universal Serial Bus (USB) based system bus (or other) depending on the storage devices used, and the like. Removable storage media 410 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 406 is encoded with application (s) 422 that supports the functionality discussed herein (the application 422 may be an application that provides some or all of the functionality of the CD services described herein, including rendezvous services). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor (s) 404 in the computer system 400.

It should be noted that, in addition to the process(es) 424 that carries (carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application 422 may also be stored in removable storage media 410, read-only memory 408 and/or mass storage device 412.

Those skilled in the art will understand that the computer system 400 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method, in a content delivery (CD) network, wherein said CD network delivers content on behalf of multiple content providers, the method comprising:
    at a server in said CD network, receiving multiple requests for content from a plurality of distinct clients, wherein the server has been assigned to serve the content;
    processing a portion of the requests without throttling;
    determining, by said server, utilization of a first capacity of said server;
    in response to determining the utilization of the first capacity of said server exceeds a first threshold, degrading, by said server, processing of a plurality of said requests, wherein degrading processing of the plurality of said requests comprises throttling processing of the plurality of the requests; and
    in response to determining that the utilization of the first capacity of the server falls below a second threshold, un-degrading, by the server, processing of at least one degraded request in said plurality of requests, wherein the second threshold defines a lower utilization of the first capacity of the server than the first threshold, and wherein un-degrading processing of the at least one degraded request comprises processing the at least one degraded request without throttling.

2. The method of claim 1 wherein said first capacity of said server comprises: a load of said server.

3. The method of claim 1 wherein said server continues to accept new incoming requests while degrading processing of the plurality of requests.

4. The method of claim 3 wherein, while processing of any requests is degraded, at least some of the new incoming requests are also degraded.

5. The method of claim 1 wherein at least a set of said multiple requests are not degraded.

6. The method of claim 5 wherein said set of multiple requests are older than said plurality of said multiple requests.

7. The method of claim 5 wherein all of the requests that are degraded are newer than requests that are not degraded.

8. The method of claim 5 wherein said requests that are not degraded are based on the age of the requests and an identity of the requesting client.

9. The method of claim 1 wherein said first capacity of said server comprises: a load of said server.

10. The method of claim 1 further comprising:
based on said utilization of said first capacity of said server, un-degrading the processing of a request in said plurality of said requests.

11. The method of claim 10 wherein said first capacity of said server comprises: a load of said server.

12. An article of manufacture comprising a computer-readable medium having program instructions stored thereon, the program instructions, operable on a device in a content delivery network (CDN), said device implementing at least one content delivery (CD) service, wherein execution of the program instructions by one or more processors of said device causes the one or more processors to carry out the acts of:
receiving, by the device, multiple requests for content from a plurality of distinct clients, wherein the device has been assigned to serve the content;
processing a portion of the requests without throttling;
determining, by the device, a utilization of a first capacity of said device;
in response to determining the utilization of the first capacity of said device exceeds a first threshold, degrading, by the device, processing of a plurality of said requests, wherein degrading processing of the plurality of said requests comprises throttling processing of the plurality of the requests; and
in response to determining that the utilization of the first capacity of the device falls below a second threshold, un-degrading, by the device, processing of at least one degraded request in said plurality of requests, wherein the second threshold defines a lower utilization of the first capacity of the device than the first threshold, and wherein un-degrading processing of the at least one degraded request comprises processing the at least one degraded request without throttling.

13. The article of manufacture of claim 12 wherein said device continues to accept new incoming requests while degrading processing of the plurality of requests.

14. The article of manufacture of claim 13 wherein, while processing of any requests is degraded, at least some of the new incoming requests are also degraded.

15. A device in a content delivery network (CDN), wherein said CDN delivers content on behalf of at least one content provider, the device comprising:
at least one processor; and
memory, operatively connected to the at least one processor and storing instructions that, when executed by the at least one processor, cause the device to implement a content delivery (CD) service and to perform a method, the method comprising:
receiving multiple requests for content from a plurality of distinct clients, wherein the device has been assigned to serve the content;
processing a portion of the requests without throttling;
determining, by the device, a utilization of a first capacity of said device;
in response to determining the utilization of the first capacity of said device exceeds a first threshold, degrading, by the device, processing of a plurality of said requests, wherein degrading processing of the plurality of said requests comprises throttling processing of the plurality of the requests; and
in response to determining that the utilization of the first capacity of the device falls below a second threshold, un-degrading, by the device, processing of at least one degraded request in said plurality of requests, wherein the second threshold defines a lower utilization of the first capacity of the device than the first threshold, and wherein un-degrading processing of the at least one degraded request comprises processing the at least one degraded request without throttling.

16. The device of claim 15 wherein said device continues to accept new incoming requests while degrading processing of some requests.

17. The device of claim 16 wherein, while processing of any requests is degraded, at least some of the new incoming requests are also degraded.

* * * * *